United States Patent
Yaney

(10) Patent No.: US 10,202,210 B2
(45) Date of Patent: *Feb. 12, 2019

(54) CIRCULAR MASS ACCELERATOR

(71) Applicant: SpinLaunch Inc., Sunnyvale, CA (US)

(72) Inventor: Jonathan Yaney, Sunnyvale, CA (US)

(73) Assignee: SpinLaunch Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/962,668

(22) Filed: Apr. 25, 2018

(65) Prior Publication Data

US 2018/0237171 A1 Aug. 23, 2018

Related U.S. Application Data

(63) Continuation of application No. 15/133,105, filed on Apr. 19, 2016, now Pat. No. 10,059,472.

(51) Int. Cl.
*B64G 5/00* (2006.01)
*B64G 1/00* (2006.01)
(Continued)

(52) U.S. Cl.
CPC ............... *B64G 5/00* (2013.01); *A63B 69/40* (2013.01); *B64G 1/002* (2013.01); *B64G 1/005* (2013.01); *B64G 3/00* (2013.01)

(58) Field of Classification Search
CPC .......... B64G 1/007; B64G 1/005; B64G 3/00; B64G 2005/005; B64G 5/00; A63B 69/40
See application file for complete search history.

(56) References Cited

U.S. PATENT DOCUMENTS 3,585,978 A * 6/1971 Hurlimann ............. A63B 69/40
124/31
3,822,688 A * 7/1974 Mayne ............... A63B 69/0026
124/42

(Continued)

FOREIGN PATENT DOCUMENTS

CN 1566895 A 1/2015
CN 10511358 A 12/2015
(Continued)

OTHER PUBLICATIONS

Yaney, J., "Circular Mass Acceleration System", U.S. Appl. No. 15/133,105, filed Apr. 19, 2016, pp. 1-32.
(Continued)

*Primary Examiner* — Justin M Benedik
(74) *Attorney, Agent, or Firm* — Carr & Ferrell LLP

(57) ABSTRACT

A mass accelerator for launching objects, such as a payload, via rotational acceleration is disclosed. The system may comprise a chamber maintained at near vacuum pressure, a motor that rotates a hub attached to a tethered projectile in a circular motion inside the vacuum chamber, accelerating the payload until the payload reaches a desired launch speed. The payload may be released from the tether upon reaching the desired launch speed and may exit the chamber through an exit port that is opened briefly to allow the payload to exit. In various embodiments, the circular mass acceleration system can be used to launch a payload into space orbit. By employing rotational acceleration via a mechanical approach, the acceleration system provides a cost-effective reusable system for launching objects.

20 Claims, 11 Drawing Sheets

(51) Int. Cl.
*B64G 3/00* (2006.01)
*A63B 69/40* (2006.01)

(56) References Cited

U.S. PATENT DOCUMENTS

| | | | | |
|---|---|---|---|---|
| 4,238,968 | A * | 12/1980 | Cook | F03G 3/00 74/84 R |
| 4,463,745 | A | 8/1984 | Acker | |
| 4,471,746 | A * | 9/1984 | Ando | A63B 69/40 124/41.1 |
| 4,632,086 | A * | 12/1986 | Rutten | F41B 3/04 124/6 |
| 4,942,775 | A * | 7/1990 | Monkewitz | B64G 7/00 73/865.3 |
| 5,699,779 | A * | 12/1997 | Tidman | F41B 3/04 124/1 |
| 5,857,451 | A * | 1/1999 | Ciluffo | A63B 69/0026 124/6 |
| 6,014,964 | A * | 1/2000 | Tidman | F41B 3/04 124/1 |
| 6,712,055 | B1 | 3/2004 | Tidman | |
| 7,032,584 | B2 * | 4/2006 | Tidman | F41B 3/04 124/1 |
| 7,497,211 | B2 * | 3/2009 | St. George | F41B 3/04 124/6 |
| 7,500,477 | B2 * | 3/2009 | Westmeyer | E21B 7/00 124/6 |
| 8,820,303 | B2 * | 9/2014 | Westmeyer | F41B 3/04 124/1 |
| 2004/0221838 | A1 | 11/2004 | Tidman et al. | |
| 2009/0301454 | A1 | 12/2009 | Tidman | |
| 2015/0241158 | A1 | 8/2015 | Yoakam | |

FOREIGN PATENT DOCUMENTS

WO WO2014124431 A1 8/2014
WO WO2015167384 A1 11/2015

OTHER PUBLICATIONS

International Search Report and "Written Opinion of the International Searching Authority," Patent Cooperation Treaty Application No. PCT/US2018/018725, dated Apr. 26, 2018, 8 pages.

* cited by examiner

CIRCULAR MASS ACCELERATOR

CROSS-REFERENCE TO RELATED APPLICATIONS

The present application is a continuation of, and claims the priority benefit of, U.S. patent application Ser. No. 15/133,105 filed on Apr. 19, 2016, now granted as U.S. Pat. No. 10/059,472 issued on Aug. 28, 2018. The disclosure of the above-referenced application is incorporated herein in its entirety for all purposes.

FIELD OF THE INVENTION

The present disclosure relates generally to the field of mass acceleration systems, and more specifically to systems and methods for launching a projectile using centrifugal acceleration.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Various embodiments of the present disclosure may be directed to an acceleration system for launching a projectile. An exemplary system may comprise a chamber at vacuum pressure, and a tether having a first end portion, a central portion, and a second end portion. The first end portion may be coupled to a projectile. A motor may rotate a hub coupled to the tether in a circular motion inside the chamber, the rotating causing the projectile to accelerate until it reaches a desired launch speed. A release mechanism may release the projectile from the tether once it reaches the launch speed. An exit port may allow the projectile to exit from the chamber upon release from the tether.

According to additional exemplary embodiments, the present disclosure may be directed to an acceleration system for launching a projectile. An exemplary system may comprise a chamber at vacuum pressure. The chamber may comprise an inverted dome-shaped roof structure comprising a plurality of roof panels under tension. A tether may comprise a first end coupled to a projectile in proximity to an edge of the chamber and a second end coupled to a motor at a center of the chamber. The motor may cause the tether and the projectile to rotate in a circular motion until the projectile reaches a desired launch speed. A release mechanism may release the projectile from the tether once it reaches the launch speed. An exit port may allow the projectile to exit from the chamber upon release from the tether.

According to still further exemplary embodiments, the present disclosure may be directed to a method for launching a projectile. An exemplary method may comprise coupling a projectile to a tether within a vacuum chamber. At least a portion of air within the chamber may be removed to create a vacuum condition within the chamber. The tether and the coupled projectile may be rotated in a circular motion until a speed of the projectile reaches a desired launch speed. The projectile may be released from the tether, and then launched from the chamber out an exit port.

BRIEF DESCRIPTION OF THE DRAWINGS

Embodiments are illustrated by way of example and not by limitation in the figures of the accompanying drawings, in which like references indicate similar elements.

DETAILED DESCRIPTION

Figure 1:
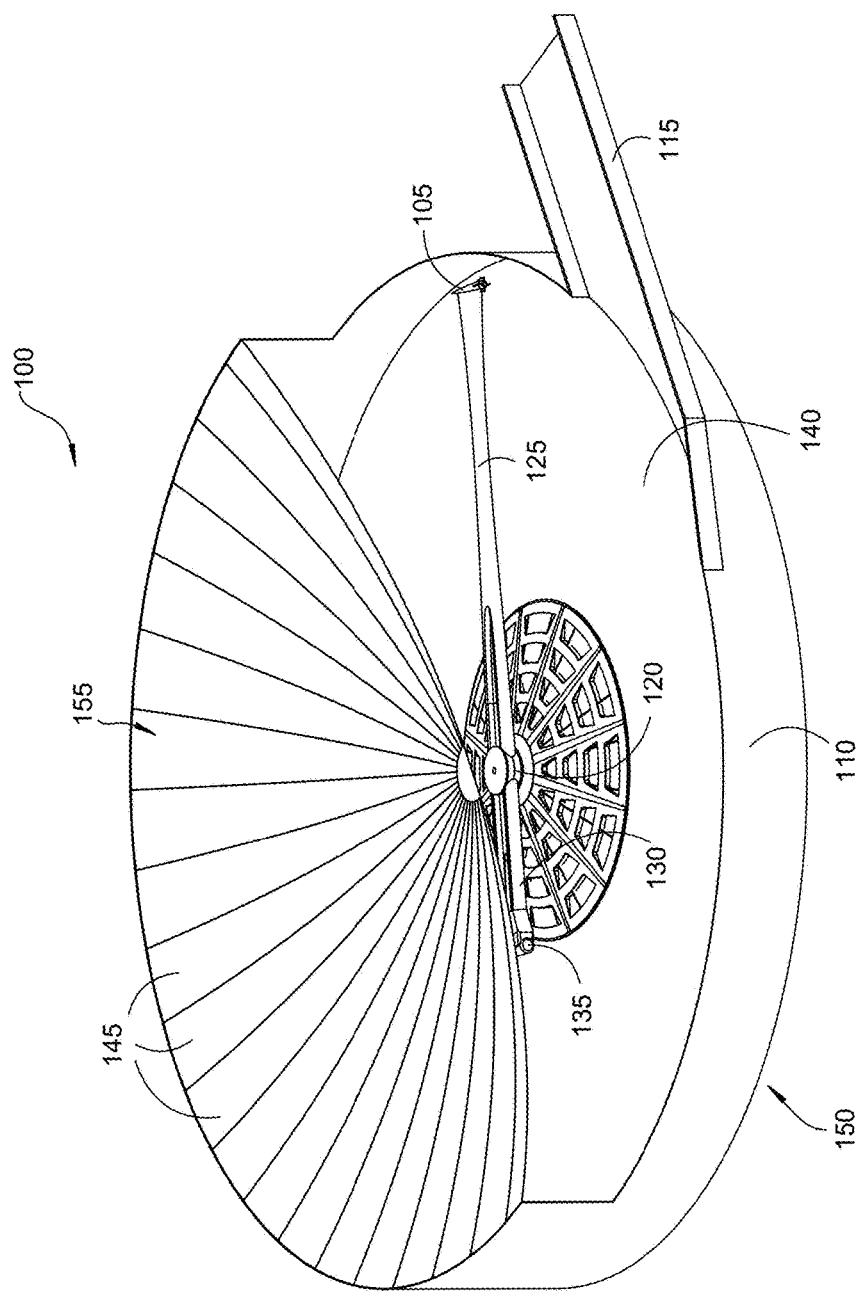
FIG. 1 is a partial cutaway view of a circular mass accelerator structure according to various embodiments.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and other changes can be made without departure from the scope of what is claimed. The following detailed description is therefore not to be taken in a limiting sense, and the scope is defined by the appended claims and their equivalents.

A mass accelerator can be used for many applications, such as launching projectiles downrange or for launching a payload into space. Delivering a projectile downrange requires sufficient energy to provide sufficient velocity for the projectile under given launch parameters (e.g., mass of the projectile, launch angle, etc.) to accurately reach a downrange position. In mass acceleration for space applications, one fundamental problem of rocket-propelled launch vehicles is to generate sufficient energy and velocity to place the payload into orbit. Traditional rockets carry massive quantities of propellant to deliver payloads that are minute fractions of the overall vehicle sizes and weights. All the performance and risks are built into a precision, often single-use vehicle that must be highly reliable and inherently costly.

While incremental gains have been made in rocket technologies to reduce space launch costs, alternative approaches are necessary to reduce those costs and increase launch rates by the orders of magnitude necessary to create exponential growth in the space transportation industry. Since the beginning of the space program, ground-based non-rocket launch systems such as rail guns and ram accelerators have been proposed to achieve this; however, all have employed unproven technologies with cost prohibitive initial capital investment. In contrast, the present disclosure comprises an innovative acceleration system which may achieve very high launch speeds without the need for enormous power generation or massive infrastructure. In various embodiments of the present disclosure, an electric or combustion-driven motor or turbine may spin a tether and launch vehicle (which may be a projectile or a payload) inside a vacuum chamber until the launch vehicle reaches a desired launch speed. The launch vehicle may then be then released through a tangential exit port into its launch trajectory. In various embodiments comprising a space launch, the acceleration system may launch the launch vehicle such that it ascends above the appreciable atmosphere, after which an onboard rocket may provide the final required velocity for orbital insertion. Because the majority of the energy required to reach orbit may be sourced from ground-based electricity as opposed to complex rocket propulsion, total launch cost may be reduced by at least an order of magnitude over existing launch systems.

FIG. 1 illustrates a partial cutaway view of the launch system 100 according to various embodiments. The launch system 100 may comprise a circular mass accelerator structure 150 comprising a floor 140 and side walls 110. In certain embodiments, a diameter of the circular mass accelerator structure 150 may be approximately 100 meters, although one skilled in the art will readily recognize that the diameter may be more or less than 100 meters depending on particular applications. The floor 140 and side walls 110 may be constructed of any suitable structural material or combination of structural materials, such as concrete, steel, composite, and the like. As further illustrated in FIG. 2, a roof structure 155 may span the distance across the side wall 110. In some embodiments, the roof structure 155 may comprise a plurality of thin wall mild steel wedge-shaped panels 145 coupled together to form a concave dome shape. As illustrated in the cross-sectional view of FIG. 3A according to various embodiments, the entirety of the concave dome roof structure 155 may span the circular mass accelerator structure 150 without interior structural support. The roof structure 155 may be supported by a circumferential compression ring. In this configuration, the roof structure 155 may be in a tensile state at operating vacuum pressures that avoids the potential of buckling that may be encountered with alternative types of freestanding structures.

The circular mass accelerator structure 150 may comprise a sealed chamber that can be placed under at least partial vacuum by evacuating at least a portion of the air within the circular mass accelerator structure 150. In certain embodiments, the pressure within the circular mass accelerator structure 150 may be reduced to about $10^{-2}$ torr, although a pressure of less than about $10^{-1}$ torr may be acceptable depending on particular applications. At pressures less than about $10^{-2}$ torr, outgassing complications may begin to occur from the roof 155 and walls if constructed from mild steel, such as A-36. If pressures substantially less than about $10^{-2}$ are desired, then the roof 155 and walls may be coated or constructed of different materials suitable to those pressures.

A concern in vacuum chamber designs is typically the level or quality of vacuum desired. In the present disclosure, air is evacuated from the circular mass accelerator structure 150 only for the purpose of minimizing drag and aerodynamic heating, so a high level vacuum as is ordinarily called for in common vacuum chamber designs may not be necessary. The maximum external pressure imposed on the circular mass accelerator structure 150 is about 14.7 psi which is well within the strength capability of standard mild steel plate.

Figure 2:
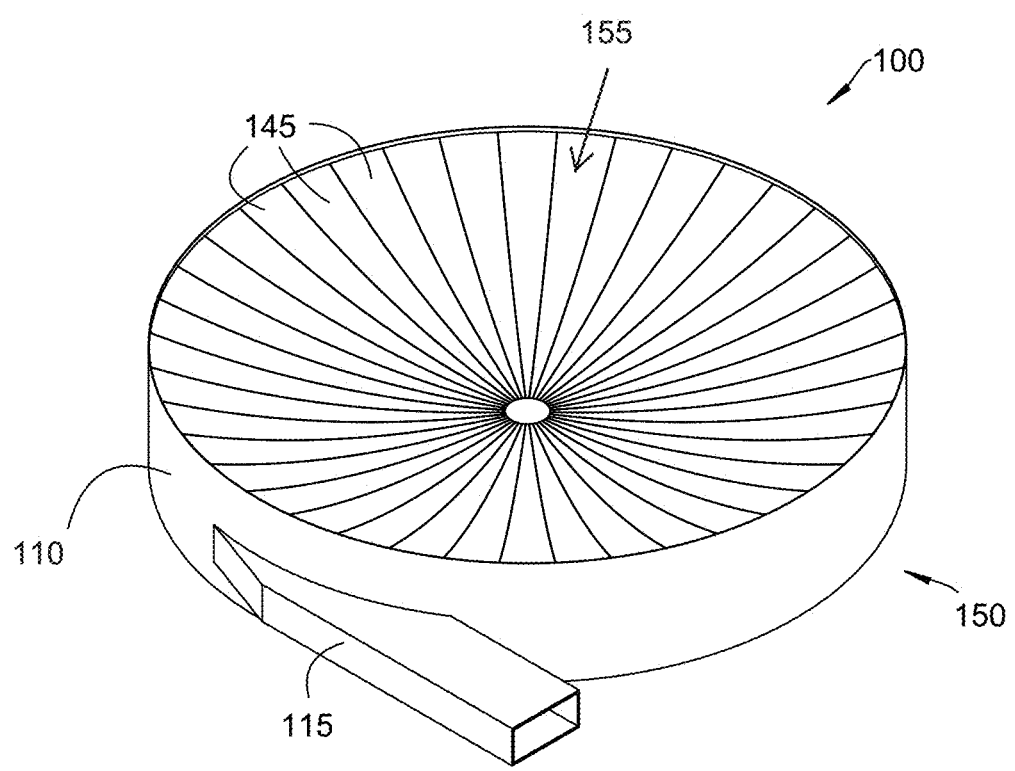
FIG. 2 is a perspective view of a circular mass accelerator structure according to various embodiments.

FIGS. 1 and 2 illustrate a circular mass accelerator structure 150. A circular shape has been selected for certain embodiments because of the even distribution of load forces throughout the structure due to the mass of the roof structure and atmospheric forces on the roof 155 when the circular mass accelerator structure 150 is under vacuum. However, one skilled in the art will recognize that the circular mass accelerator structure 150 could instead be any non-circular shape desired, such as oval or rectangular. However, deviations from a circular design may impose design constraints that could drive up overall costs.

Figure 3A:
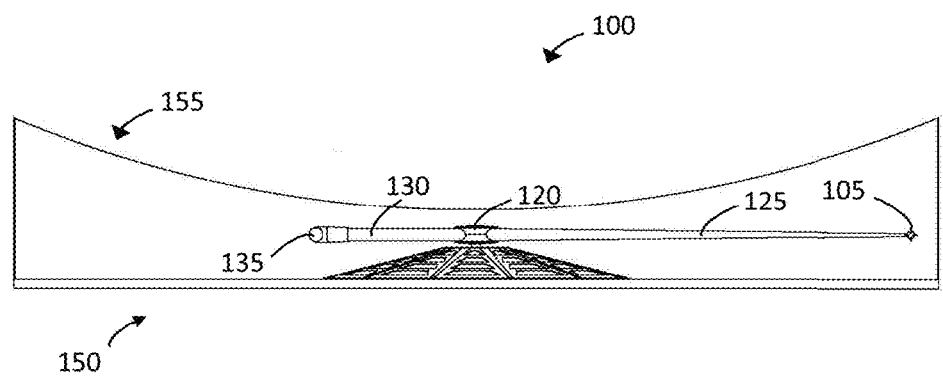
FIG. 3A is a front cross-sectional view of a circular mass accelerator structure according to various embodiments.

FIGS. 1 and 3A also illustrate a generally flat floor 140 of the circular mass accelerator structure 150. In certain embodiments to reduce costs, the floor 140 may be constructed in a similar fashion to the roof 155 using a dome-shaped tension structure. In those embodiments in which the domed floor 140 is not inverted (i.e., convex opposite to the concave roof 155), the two dome shapes of the roof 155 and the floor 140 may reduce the interior volume of the circular mass accelerator structure 150, thereby reducing the amount of air to be pumped out to achieve the desired level of vacuum.

Although not visible in FIG. 1 or 3A, the circular mass accelerator structure 150 may house an electrically-driven or combustion-driven motor. A rotating shaft coupled to the motor may extend upwards, and a hub 120 may be coupled to a terminal end of the shaft. A launch vehicle tether 125 may be coupled to the hub 120 at one end and to the launch vehicle 105 at an opposite end. A counterweight tether 130 may be coupled at one end to the hub 120 directly opposite the launch vehicle tether 125 and to a counterweight 135 at an opposite end. While the launch vehicle tether 125 and counterweight tether 130 are described in some embodiments separately, they can actually be portions of a singular tether coupled to the hub 120.

Figure 4:
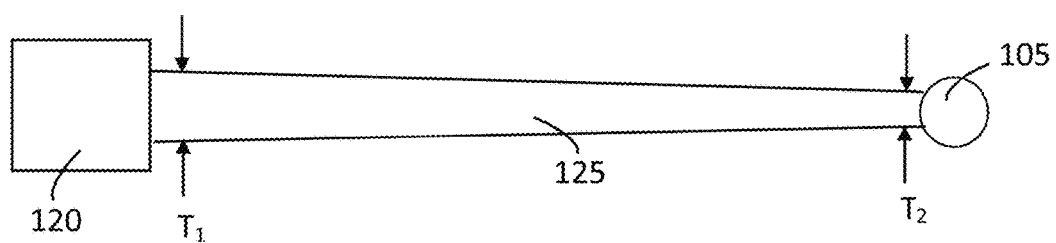
FIG. 4 is a schematic view of a tether according to various embodiments.

The launch vehicle tether 125 may be subjected to high tensile loads during operation. For a baseline launch vehicle 105 of 2000 kg accelerated to 3,000 m/s, and spinning at 535 RPM, the load on the tether will be $3.14 \times 10^8$ N. Materials advancements during the last two decades in ultra-high tensile strength materials such as PBO, UHMPE, aramid, Kevlar, carbon fiber, carbon nanotubes, and combinations thereof, have enabled launch vehicle tether 125 construction at reasonable cost. At 535 RPM, the tip of the launch vehicle tether 125 is travelling at 2,800 m/s and is in tension with 16,000 g of radial acceleration (assuming a launch vehicle tether 125 length of 50 m). The launch vehicle tether 125 may be aerodynamically shaped to minimize drag and aerodynamic heating at supersonic speeds. In addition, as illustrated in FIG. 4, the launch vehicle tether 125 may have a larger cross-sectional thickness $T_1$ at the end coupled to the hub 120 than a cross-sectional thickness $T_2$ at the end coupled to the launch vehicle 105. The ratio of $T_1:T_2$ may be derived by a formula to minimize the mass of the launch vehicle tether 125 while maximizing tensile strength.

Because of the highly optimized launch vehicle tether 125 design, minimal electrical harnessing is routed through the launch vehicle tether 125 to the launch vehicle 105 for power. Just prior to chamber pump down, all hardline connections for power and command and telemetry may be disconnected, and the launch vehicle 105 and its payload may switch to internal power. Henceforth, command and telemetry for the launch vehicle 105 and its payload may be transmitted via RF airlink or other suitable communications technology (wired or wireless).

The launch vehicle 105 may have a low-angle conical shape, designed for hypersonic speeds and contain, for example, a payload, fairing/sabot, avionics, thermal protection, and aerodynamic stabilization systems. The launch vehicle 105 may further comprise stabilizing fins at an aft end. The circular mass accelerator structure 150 may be evacuated to a low pressure environment as described above to reduce drag and aerodynamic heat load on the launch vehicle 105 and tether. Once accelerated to the desired launch speed, the launch vehicle 105 may be released into the ambient environment through a fast-actuating exit port 115, and the launch vehicle 105 may ascend on a ballistic trajectory to its desired altitude. If so equipped, the launch vehicle's 105 onboard rocket propulsion system may provide the final energy necessary to achieve a desired orbital altitude and inclination. As opposed to current microsatellite launch vehicles which have 3 or 4 stages totaling 70 to 100 ft. in length, various embodiments of the launch vehicle 105 of the present disclosure for a similar payload may have only one stage and may be about 15 ft. in length.

Figure 5A:
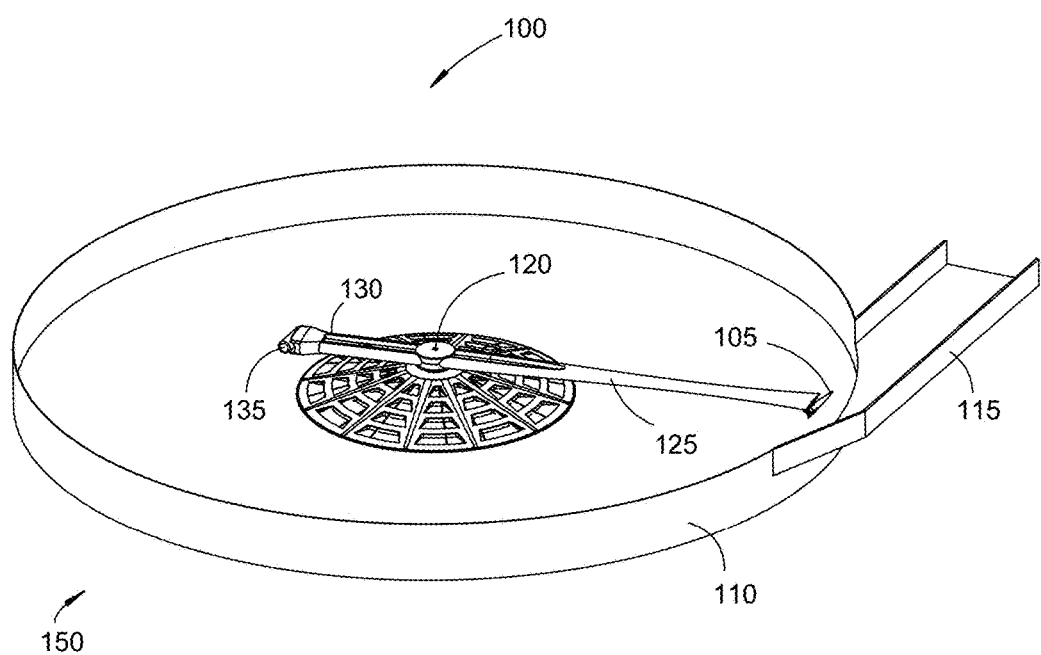
FIG. 5A is a perspective cutaway view of a circular mass accelerator showing a launch event according to various embodiments.
Figure 5B:
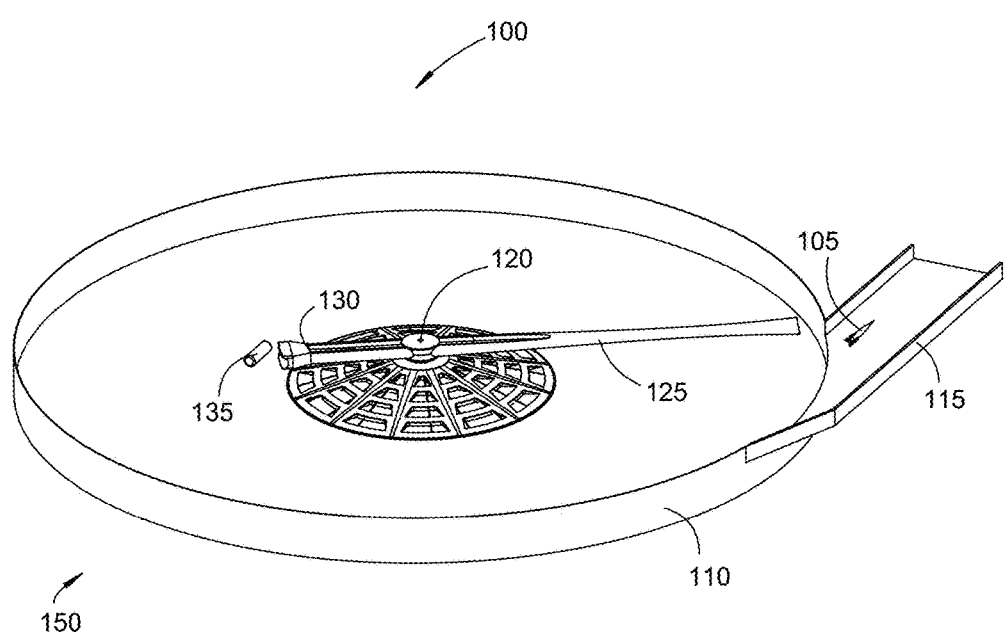
FIG. 5B is a perspective cutaway view of a circular mass accelerator showing a launch event according to various embodiments.
Figure 5C:
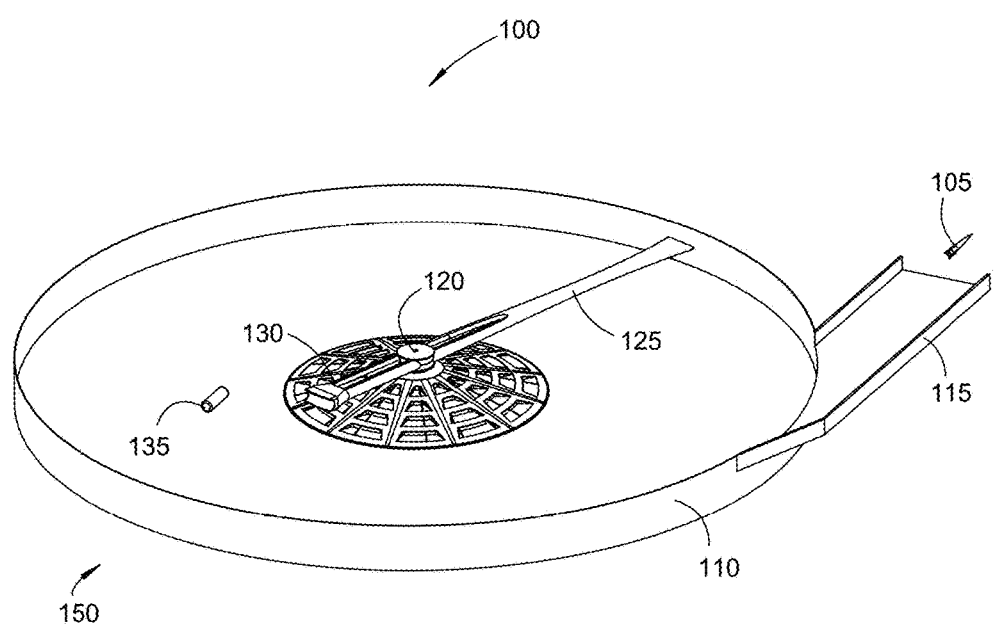
FIG. 5C is a perspective cutaway view of a circular mass accelerator showing a launch event according to various embodiments.

A sequence of events for launching the launch vehicle 105 from the circular mass accelerator structure 150 according to various embodiments is illustrated in FIGS. 5A through 5C (the roof 155 is not shown in FIGS. 5A through 5C in order to more clearly illustrate interior components of the launch system 100). Once a desired velocity is attained (measured, for example, either as a velocity of the launch vehicle 105 or RPM of the launch vehicle tether 125), the launch vehicle 105 may be released from the launch vehicle tether 125 at a point where a tangential vector of the path of the tether 125 aligns with the exit port 115 as illustrated in FIG. 5A. Simultaneously, the counterweight 135 may be released from the counterweight tether 130. In FIG. 5B, the launch vehicle 105 continues along the tangential vector and enters the exit port 115. The launch vehicle tether 125 and the counterweight tether 130 continue to rotate, and the counterweight 135 moves away from the counterweight tether 130. The launch vehicle 105 leaves the exit port 115 in FIG. 5C, completing the launch sequence. The counterweight continues to move outward toward the side wall 110.

Though it operates at even higher speeds, the launch vehicle 105 may draw on the pool of projectile shapes whose aerodynamics and stability characteristics have been extensively researched in supersonic and hypersonic test facilities. A variety of approaches may be employed to address thermal environments, ranging from ceramic heat shields on the Space Shuttle and ablative carbon phenolics on Galileo to heat sink tungsten nose caps on the X43 Mach 10 Scramjet vehicle and hypersonic projectile artillery shells to active cooling such German DLR Sharp Edged Flight Experiment (SHEFEX) suborbital rocket transpiration cooling experiments.

The exit port 115 may comprise any system or structure that can provide adequate sealing when the circular mass accelerator structure 150 is under vacuum and that can be opened at a high rate of speed, or alternatively pierced by the launch vehicle 105. In various embodiments, the exit port 115 may comprise a fast-actuating door or shutter. In other embodiments, the exit port 115 may comprise one or more sheets of a polymeric material such as Mylar which may be pierced by the launch vehicle 105 upon launch.

Although not shown in the previous figures, the circular mass accelerator structure 150 may comprise a second exit port directly opposite the exit port 115 to capture the counterweight 135 that is released simultaneously with the launch vehicle 105 to minimize an imbalance on the motor at the time of release. The counterweight 135 may be a solid material, or a liquid such as water.

The launch system 100 described above may be a fixed-base system designed according to various embodiments to launch a payload of about 40 kg to 150 km altitude circular orbit, or to deliver the payload downrange. In addition to performance targets, the launch system 100 may typically be designed with a radial acceleration of 5,000-25,000 g although launch systems may be designed with radial accelerations greater than or less than this range in other embodiments. In exemplary embodiments, the radial acceleration is 15,000-20,000 g. Overall system operating parameters according to exemplary embodiments are enumerated in Table 1.

TABLE 1

Exemplary Launch System Operating Parameters

| Parameter | Value |
|---|---|
| Vehicle Mass | 2,000 kg |
| Payload Mass | 43 kg |
| Launch Velocity | 2,800 m/s |
| | M = 8.2 (Sea Level) |
| Orbital Altitude | 350 km |
| Circular Mass Accelerator Size | 100 m Diameter |
| Rotational Speed | 535 RPM |

Figure 6:
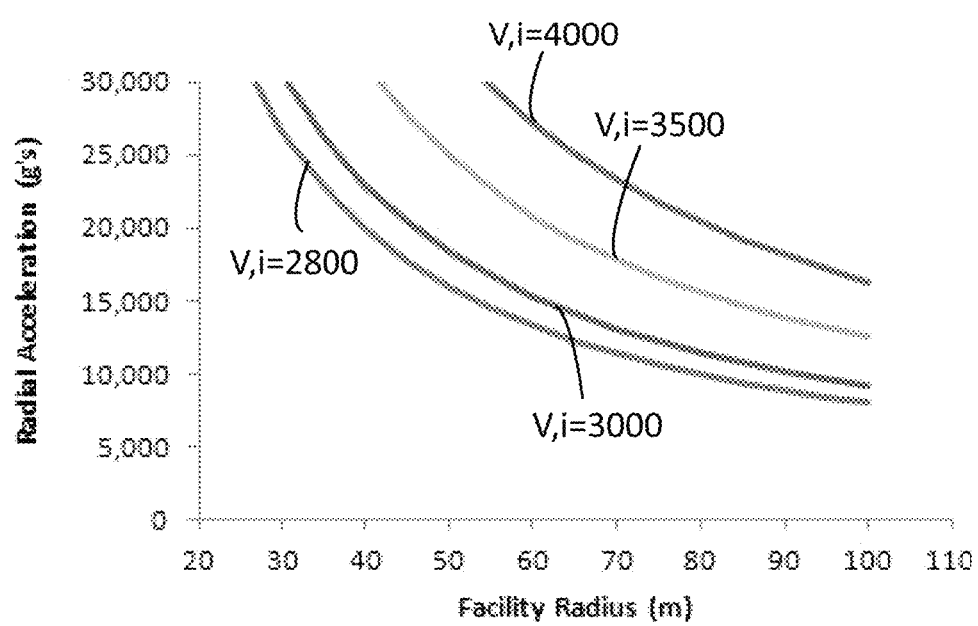
FIG. 6 is a graph showing the relationship between acceleration and chamber diameter as a function of launch velocity according to various embodiments.

The rotational speed, and eventual launch velocity V, of the launch vehicle 105 may be set by the motor. The maximum designed radial acceleration may determine the length of the launch vehicle tether 125, and consequently the interior diameter of the circular mass accelerator structure 150. FIG. 6 illustrates the interrelationship between the acceleration and circular mass accelerator structure 150 chamber diameter as a function of launch velocity. For example, given the exemplary launch system operating parameters in Table 1 and consulting the graph of FIG. 6, if a maximum radial acceleration of 16,000 g is desired at a launch velocity of 2,800 m/s then FIG. 6 indicates that a facility radius of approximately 50 m (100 m diameter) would be required.

A typical sequence of launch events for exemplary embodiments involving orbital insertion is presented in Table 2.

TABLE 2

Sequence of Events for Exemplary Launch

| Event | Time |
|---|---|
| Pump Down of Circular Mass Accelerator Structure | L0-60 min |
| Spinup of Motor | L0-30 min |
| Release Launch Vehicle | L0-3 msec |
| Launch | L0 |

TABLE 2-continued

Sequence of Events for Exemplary Launch

| Event | Time |
| --- | --- |
| Fairing/Sabot Separation | L0 + 45 sec |
| First Burn Start | L1, L0 + 60 sec |
| First Burn Complete | L1 + 128.1 sec |
| Second Burn Start | L2 |
| Target Orbital Insertion | L2 + 11.3 sec |

Figure 7A:
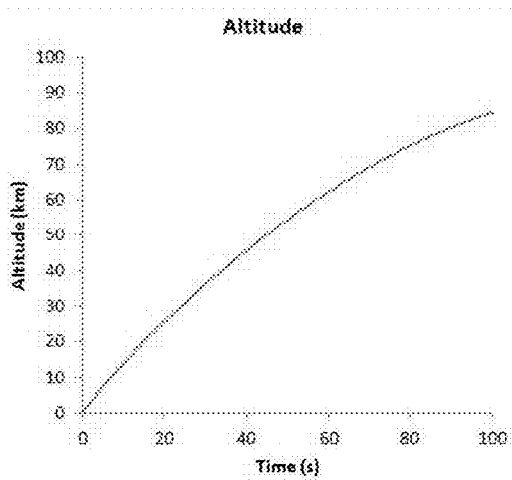
FIG. 7A is a graph of baseline booster phase flight profile showing altitude as a function of time according to various embodiments.
Figure 7B:
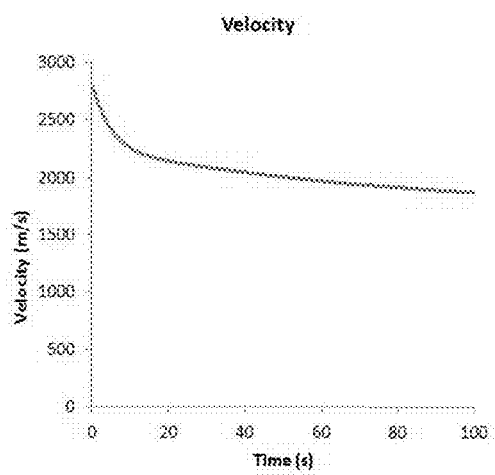
FIG. 7B is a graph of baseline booster phase flight profile showing velocity as a function of time according to various embodiments.
Figure 7C:
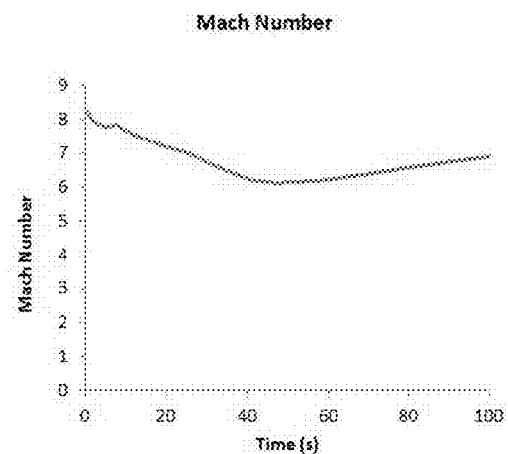
FIG. 7C is a graph of baseline booster phase flight profile showing Mach number as a function of time according to various embodiments.
Figure 7D:
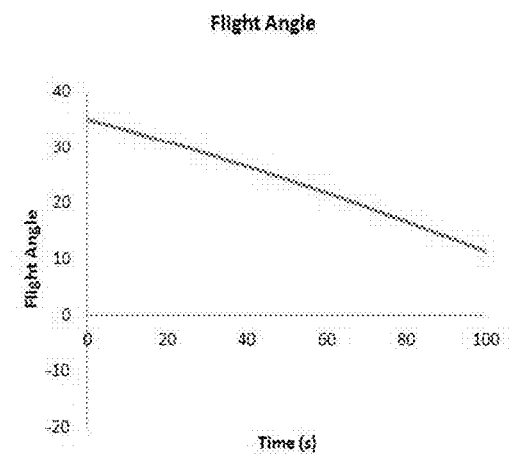
FIG. 7D is a graph of baseline booster phase flight profile showing flight angle as a function of time according to various embodiments.

As would be understood by a person of ordinary skill in the art, the flight profile may be divided into two phases: booster phase and upper stage phase. The booster phase shown in FIGS. 7A through 7D may be representative of ballistic launch with drag according to various embodiments. FIG. 7A illustrates that the altitude is an exponential function wherein the rate of increase in altitude decreases with time. The velocity may decrease sharply for the first 5-10 seconds after launch as illustrated in FIG. 7B as aerodynamic drag is imposed on the launch vehicle 105 as it leaves the circulator accelerator structure 150 and encounters non-vacuum conditions. Once the boosters ignite, the rate of deceleration decreases markedly to a gradual, near linear decline as the desired orbital insertion velocity is reached. FIG. 7C illustrates that the launch vehicle starts out well into the hypersonic realm and the Mach number decreases until an altitude of 40 km is reached (see also FIG. 7A), at which point the Mach number gradually increases. The flight angle as illustrates in FIG. 7D steadily decreases as the curved flight path of the launch vehicle 105 flattens out as the launch vehicle 105 approaches orbital insertion. The mission design may be further refined to match the initial conditions for the upper stage first burn, L1, and optimized for upper stage performance to tailor the upper stage flight profile to meet a target orbit.

Figure 3B:
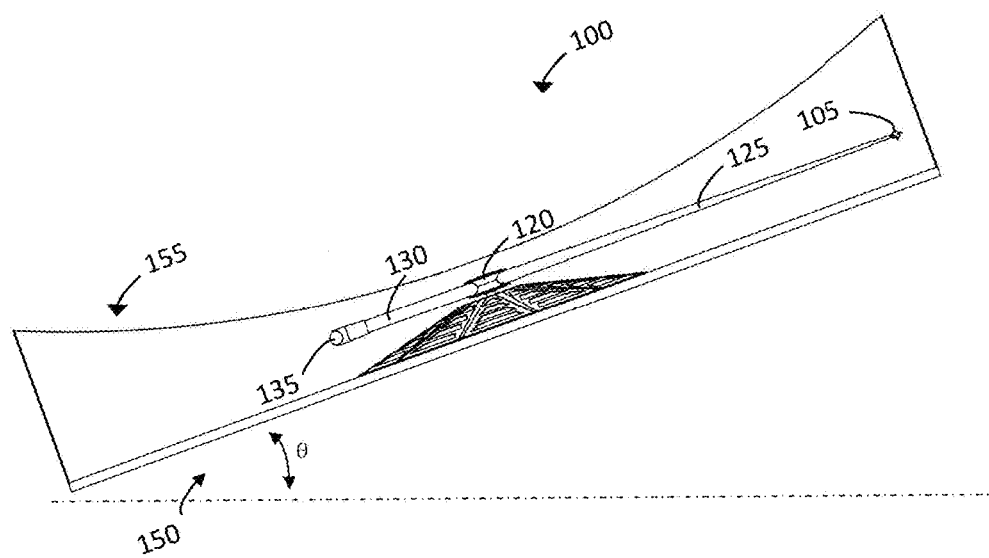
FIG. 3B is a perspective view of a circular mass accelerator structure at an angle, according to various embodiments.

Mission design for the launch system 100 may also comprise a booster and an upper stage phase, similar to the upper stage of any other launch vehicle. In this case, the booster phase is defined by the launch vehicle 105 flight conditions at the exit of the circular mass accelerator structure 150. The horizontal contribution of launch velocity V converts directly to orbital velocity at lower launch angles θ, but at the cost of greater aerodynamic drag. Trajectory optimizations illustrate an interrelationship between payload mass, launch angle θ (e.g., angle from horizontal), target orbit and launch velocity V. In addition to the higher drag, a higher corresponding total heating may occur which may require additional cooling or launch vehicle 105 mass to accommodate thermal management. The upper stage phase may be tailored to desired requirements in the same way as traditional rocket missions. An exemplary structure at a launch angle θ is depicted in FIG. 3B.

Other contributors to performance are launch altitude and launch site latitude/azimuth. Similar to traditional rocket aerodynamics, altitude dictates the prevailing Mach regime of flight which in turn determines drag coefficient. Higher altitudes generally reduce drag coefficient and a corresponding reduction in the increase in velocity required from an upper stage. The same factors contribute to lower heating rates. The launch system 100 may also benefit from higher altitudes since the circular mass accelerator structure 150 may be evacuated to vacuum more readily. This may reduce power consumption requirements as well as drag and aerodynamic heating during spinup.

Figure 8:
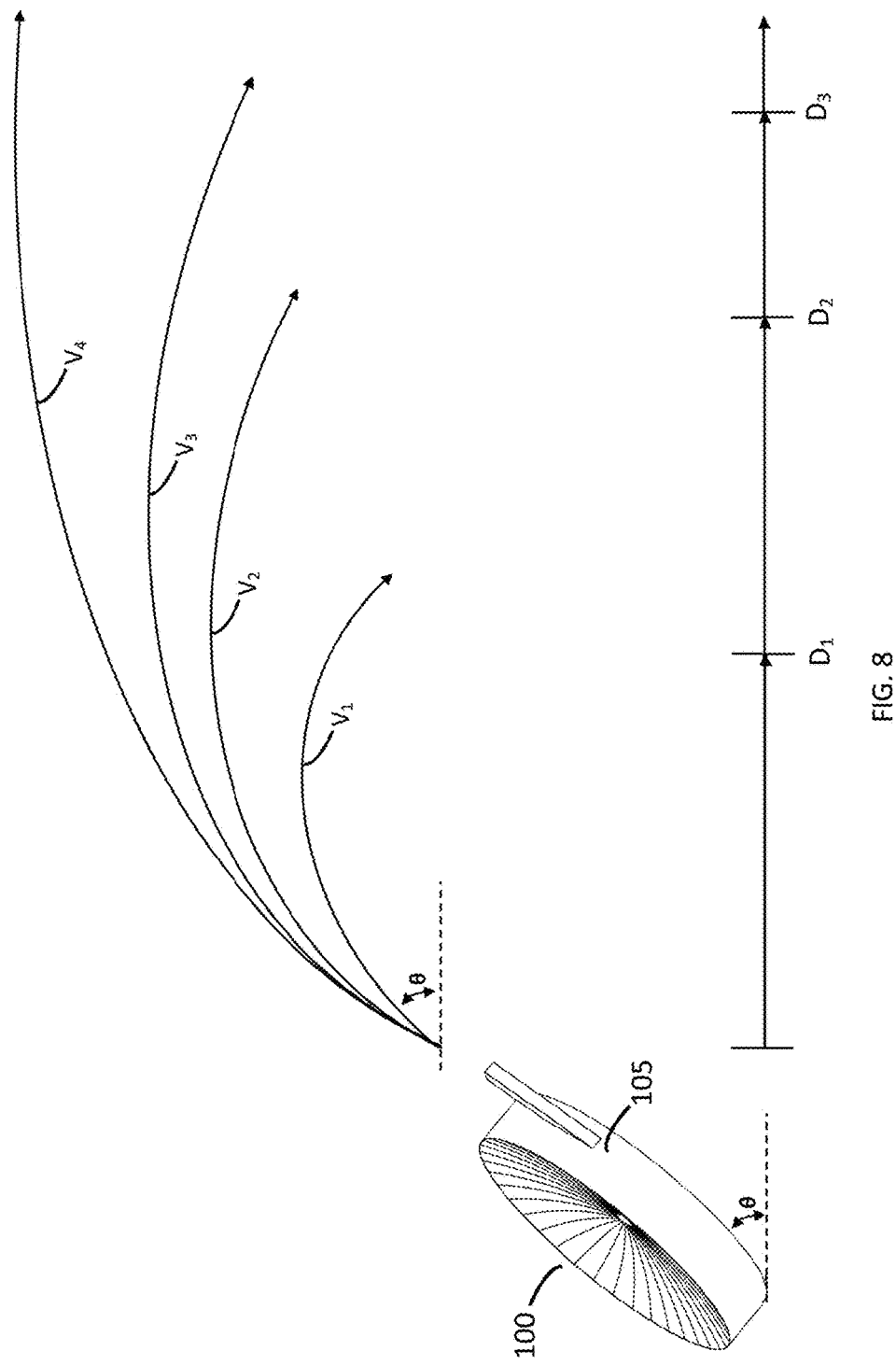
FIG. 8 is a schematic diagram of various trajectories for projectile launch velocities according to various embodiments.

FIG. 8 illustrates a schematic diagram of a trajectory for a launch vehicle 105 according to various embodiments. Within the launch system 100, the launch vehicle 105 may be rotated at a high speed under vacuum conditions until a desired launch velocity V is obtained. The launch vehicle 105 may then be released and exit the launch system 100 at a pre-determined launch angle θ (relative to horizontal). FIG. 8 illustrates that the launch vehicle 105 may achieve different downrange distances D by varying the launch velocity V, all other factors such as the mass and shape of the launch vehicle 105 and launch angle θ remaining constant. For example, at a launch velocity of $V_1$ a downrange distance $D_1$ may be achieved. Increasing the launch velocity to $V_2$ may result in a downrange distance of $D_2$, and further increasing the launch velocity to $V_3$ may result in a downrange distance of $D_3$. Increasing the launch velocity allows for a smaller onboard rocket to be required to launch the launch object out of the appreciable atmosphere and achieve orbital insertion. Although not illustrated in FIG. 8, downrange distances $D_1$, $D_2$, and $D_3$ as well as orbital insertion may be achieved by keeping the launch velocity V constant and varying the launch angle θ.

Figure 9:
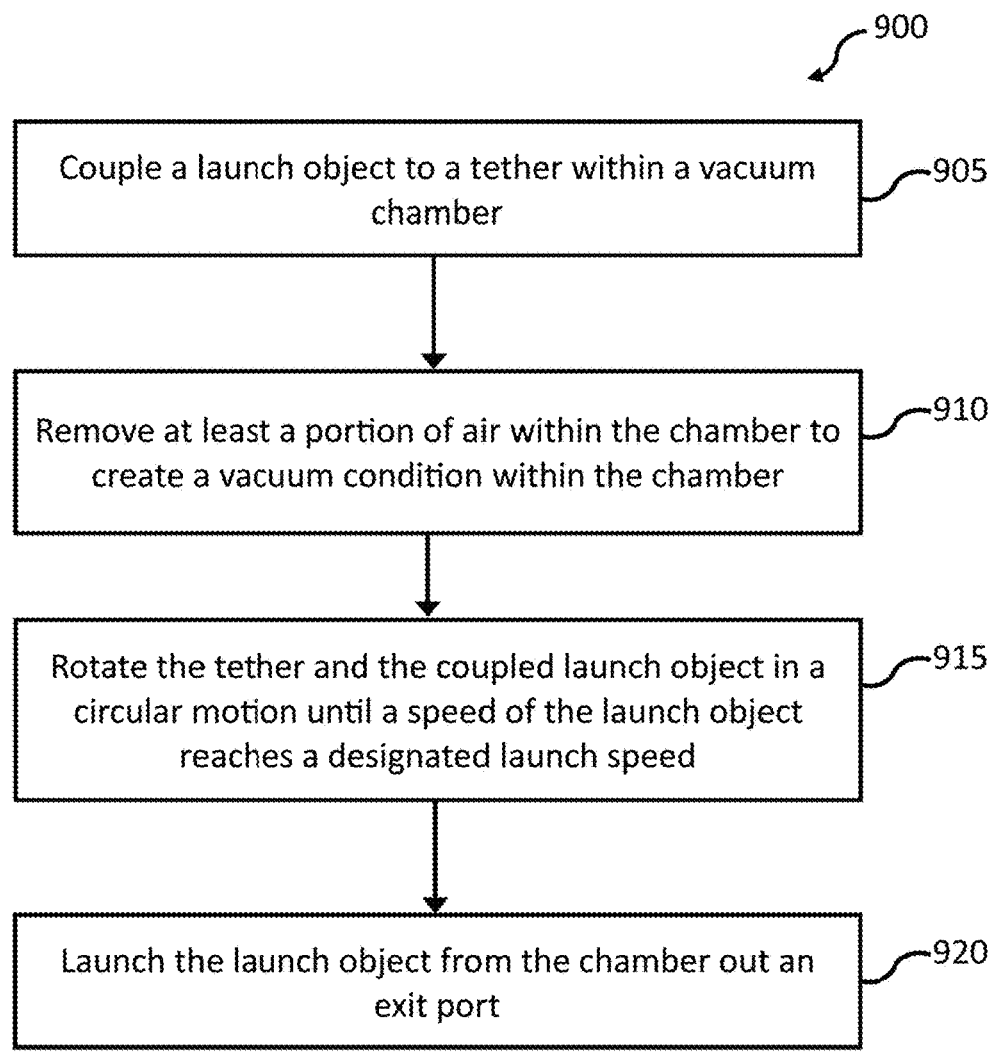
FIG. 9 is a flow diagram of an exemplary method for launching a projectile according to various embodiments.

FIG. 9 is a flowchart of an exemplary method 900 for launching a projectile, also sometimes referred to herein as launch vehicle. At step 905, a projectile 105 may be coupled to a tether 125 within a vacuum chamber 150. At least a portion of air within the chamber 150 may be removed at step 910 to create a near vacuum condition within the chamber 150. At step 915, the tether 125 and the coupled projectile 105 may be rotated in a circular motion until a speed of the projectile 105 reaches a desired launch speed. The projectile 105 may be released from the tether 125 at step 920, and the projectile 105 may be launched from the chamber 150 out an exit port 115.

Various embodiments of the launch system 100 may be used in any application in which a projectile or payload is desired to be launched to a downrange position or launched into Earth orbit or beyond. Such a mass acceleration system can be used in many applications across a variety of industries. In a space launch application, the launch system 100 may be used to deliver payloads such as satellites into Earth orbit, or to deliver space vehicles beyond Earth orbit. The launch system 100 may also be used in any application where a large amount of force is applied to a concentrated area. One such example is surface mining operations where the launch system 100 could essentially be used as a cannon to deliver an object into a hillside to break up the rock. One skilled in the art will readily recognize that the launch system 100 may be applied in any situation where a projectile can achieve a desired function.

While the present disclosure has been described in connection with a series of preferred embodiments, these descriptions are not intended to limit the scope of the disclosure to the particular forms set forth herein. The above description is illustrative and not restrictive. Many variations of the embodiments will become apparent to those of skill in the art upon review of this disclosure. The scope of this disclosure should, therefore, be determined not with reference to the above description, but instead should be determined with reference to the appended claims along with their full scope of equivalents. The present descriptions are intended to cover such alternatives, modifications, and equivalents as can be included within the spirit and scope of the disclosure as defined by the appended claims and otherwise appreciated by one of ordinary skill in the art. In several respects, embodiments of the present disclosure can act to close the loopholes in the current industry practices in which good business practices and logic are lacking because it is not feasible to implement with current resources and tools.

As used herein, the terms "having", "containing", "including", "comprising", and the like are open ended terms that indicate the presence of stated elements or features, but do not preclude additional elements or features. The articles "a", "an" and "the" are intended to include the plural as well as the singular, unless the context clearly indicates otherwise.

What is claimed is:

1. A mass accelerator for launching a payload, the mass accelerator comprising:
    an enclosed chamber under at least partial vacuum pressure;
    a tether having a first end portion, a central portion, and a second end portion, the first end portion connected to the payload;
    a motor that rotates a hub attached to the central portion of the tether in a circular motion inside the chamber, the rotating causing the payload to accelerate until it reaches a desired launch speed;
    a release mechanism that releases the payload from the tether once the payload reaches the desired launch speed; and
    an exit port to allow the payload to exit from the chamber upon release from the tether.

2. The mass accelerator of claim 1, further comprising:
    a counterweight mass coupled to the second end portion of the tether.

3. The mass accelerator of claim 2, wherein the counterweight mass is released from the tether at the same time as the payload.

4. The mass accelerator of claim 2, further comprising:
    a second exit port through which the counterweight mass exits from the chamber, the second exit port located directly opposite to the exit port for the payload.

5. The mass accelerator of claim 1, wherein the chamber has a concave roof.

6. The mass accelerator of claim 1, wherein the chamber is of a circular shape.

7. The mass accelerator of claim 1, wherein the tether is geometrically tapered such that the first end portion and the second end portion are of less mass than the central portion.

8. The mass accelerator of claim 1, wherein the payload comprises an onboard rocket to provide additional required velocity for the payload to enter a space orbit.

9. An acceleration system for launching a payload, the system comprising:
    a chamber under at least partial vacuum pressure, the chamber comprising a concave dome-shaped roof structure comprising a plurality of roof panels under tension;
    a tether comprising a first end coupled to a payload in proximity to an edge of the chamber and a second end coupled to a motor at a center of the chamber, the motor causing the tether and the payload to rotate in a circular motion until the payload reaches a desired launch speed;
    a release mechanism that releases the payload from the tether once the payload reaches the desired launch speed; and
    an exit port to allow the payload to exit from the chamber upon release from the tether.

10. The system of claim 9, wherein the vacuum pressure within the chamber is $10^{-1}$ torr or less.

11. The system of claim 9, wherein the vacuum pressure is selected to reduce aerodynamic drag and aerodynamic heating of the tether.

12. The system of claim 9, wherein the exit port comprises a membrane that is pierced by the payload as the payload exits the chamber.

13. The system of claim 9, wherein the exit port comprises a high-speed shutter that opens to allow the payload to pass through the exit port.

14. The system of claim 9, wherein the payload comprises a vehicle destined for a space orbit.

15. The system of claim 9, further comprising: electrical harnessing routed through the tether to the payload to provide power to the payload.

16. A method for launching a payload into space orbit, the method comprising:
    coupling a payload to a tether within an enclosed chamber;
    removing at least a portion of air within the chamber to create at least a partial vacuum condition within the chamber;
    rotating the tether and the coupled payload in a circular motion until a speed of the payload reaches a desired launch speed;
    releasing the payload from the tether; and
    launching the payload from the chamber via an exit port.

17. The method of claim 16, wherein the removing at least a portion of the air within the chamber comprises removing at least a portion of the air within the chamber such that a pressure within the chamber is $10^{-1}$ torr or less.

18. The method of claim 16, wherein the rotating the tether and the coupled payload in a circular motion comprises rotating the tether and the coupled payload in a circular motion until centrifugal forces on the payload reach 5,000-20,000 g.

19. The method of claim 16, further comprising simultaneously releasing a counterweight when the payload is released from the tether.

20. The method of claim 16, further comprising:
    igniting a booster onboard the payload, to bring the payload to a desired orbital insertion velocity.

* * * * *